July 9, 1935.  H. K. KAPLAN  2,007,497

SCAFFOLD COUPLING AND CLAMP

Filed Oct. 4, 1933   3 Sheets-Sheet 1

INVENTOR
H. K. Kaplan
BY
ATTORNEY

July 9, 1935.  H. K. KAPLAN  2,007,497
SCAFFOLD COUPLING AND CLAMP
Filed Oct. 4, 1933  3 Sheets-Sheet 3
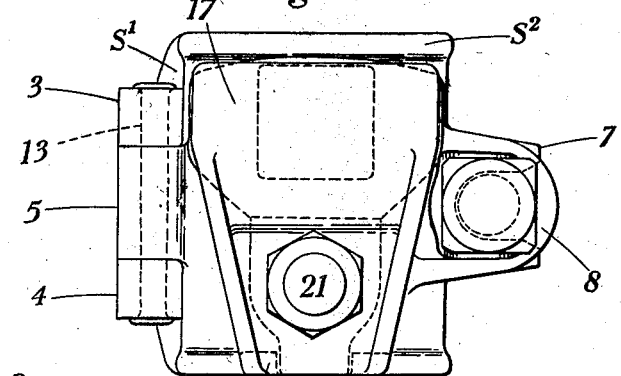
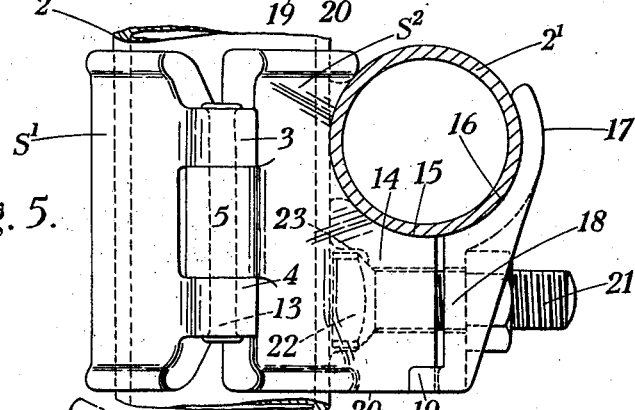
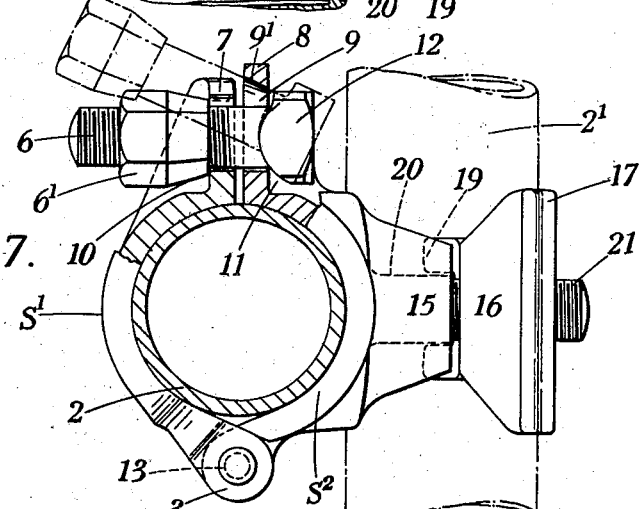
INVENTOR
H. K. Kaplan
BY
ATTORNEY Patented July 9, 1935

2,007,497

UNITED STATES PATENT OFFICE 2,007,497

SCAFFOLD COUPLING AND CLAMP

Harry Kasse Kaplan, London, England

Application October 4, 1933, Serial No. 692,191
In Great Britain October 11, 1932

2 Claims. (Cl. 189—36)

This invention relates to scaffolding and staging as employed for the convenience of workmen and the conveyance of materials in the erection of buildings and to other temporary structures, for instance, towers for cranes and lifts, and supports for platforms used for floodlighting in cinematographic studios and other purposes.

The present invention relates more particularly to the joint or coupling members that are adapted to rigidly couple together suitable lengths of the tubular posts or standards and are provided with means for receiving and securing thereto the transverse members or putlogs.

The invention further provides a construction of clamp or clip that may be readily secured to a post or upright in any position thereon convenient to receive the transverse members or putlogs to be carried thereby.

According to the main feature of this invention each coupling comprises a sleeve, the wall of which is split vertically at its upper and lower ends whereby the two posts to be united and inserted in the bore of the sleeve are rigidly locked in a coupled position by means of bolts that pass through outwardly projecting lugs on either side of the splits and thereby tend to force the severed surfaces into contact so that the sleeve exerts a gripping action on the posts.

The sleeve wall is provided with one or more integral jaws that co-operate with opposing detachable jaws to form seating surfaces for the transverse members or putlogs the axes of which are disposed at right angles to the vertical axes of the posts and which are secured in position by bolts that engage both jaws and clamp the detachable jaws into engagement with the putlogs.

In a modified form of this coupling or clamping sleeve, the sleeve wall is split vertically throughout its entire length so that the sleeve is in two parts that are hinged together and are united to embrace a post passing through the bore thereof and to rigidly clamp the same by means of bolts passing through lugs projecting from the outer edge of each half sleeve. This clamping sleeve is provided with co-acting integral and detachable jaws similar to those referred to above to enable the sleeve, readily clamped in any desired position on a post, to carry the transverse members or putlogs.

But in order that the invention may be more clearly understood, reference may now be made to the accompanying drawings in which:—

Figure 1:
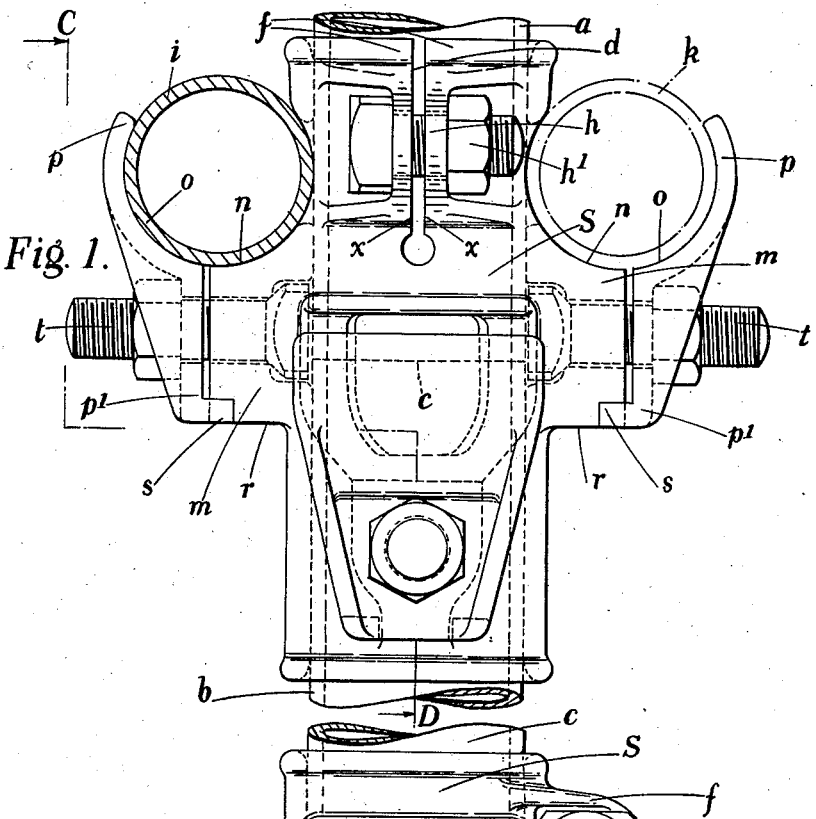

Figure 1 shews the coupling in elevation, positioned to unite two posts or standards and carrying three transverse members or putlogs.

Figure 2:
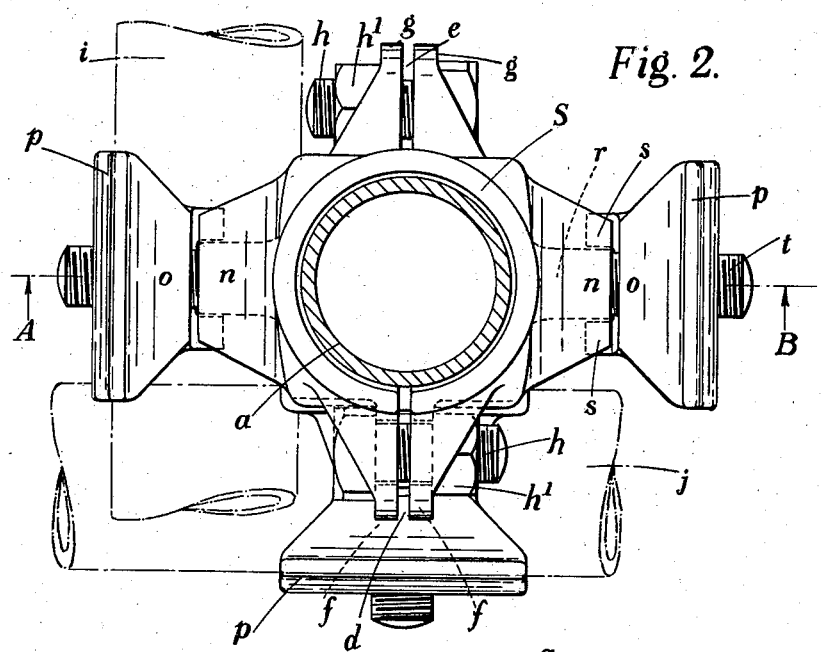

Figure 2 is a plan of Figure 1.

Figure 3:
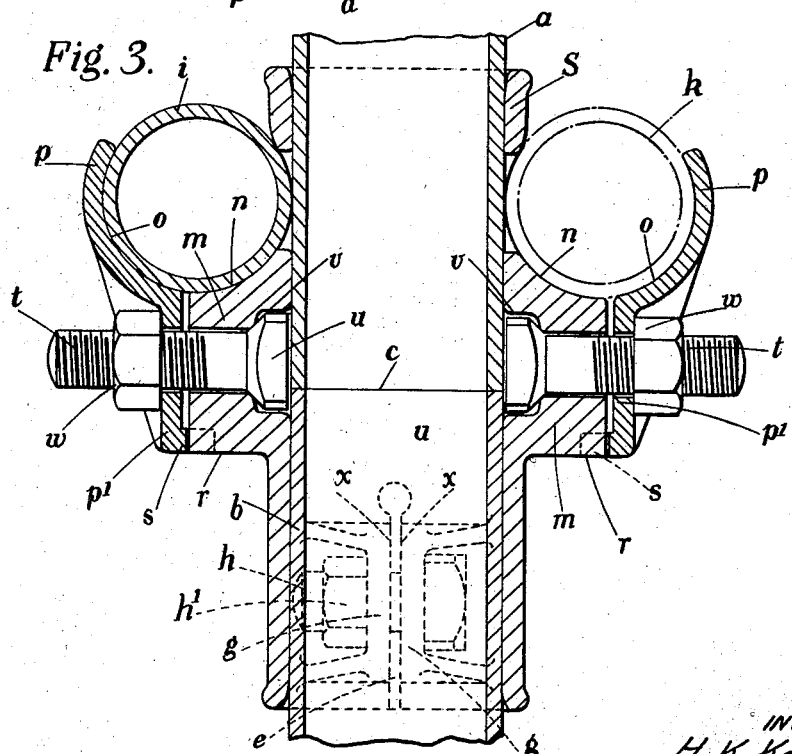

Figure 3 a sectional elevation on the line A—B.

Figure 4:
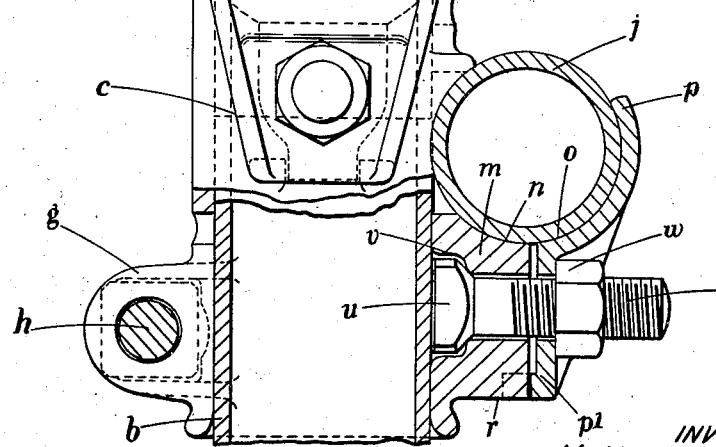

Figure 4 is a view partly in section taken on the line C—D, Fig. 1.

Figure 5 shews a modified form of clamping sleeve or clip carrying a transverse member or putlog.

Figure 6 is a side elevation of the clamp shewn in Figure 5 and

Figure 7 a plan view of the same.

Similar reference characters relate to similar parts throughout all the figures of the drawings, and referring now to Figures 1 to 4 thereof it will be seen that the coupling designated by the letter S is of sleeve formation and employed to unite two posts $a$ and $b$ which abut on the median transverse plane $c$ of the coupling. The upper and lower ends of the wall of sleeve S are split at $d$ and $e$ and lugs $f$ and $g$ project outwardly from the periphery of the sleeve S on either side of the slits $d$ and $e$ respectively.

The lugs $f$ and $g$ are provided with clearance holes for connecting bolts $h$ and it will be clear that the act of tightening up these bolts by means of the nuts $h'$ will tend to draw the severed surfaces $x$ into contact so that the sleeves S firmly grip the posts $a$ and $b$ and hold them rigidly in the coupled position.

The coupling illustrated in Figure 1 will carry three transverse members or putlogs $i, j, k$, disposed as required by the rectangular formation of the structure with their axes at right angles to the vertical axes of the posts $a$ and $b$. To this end the sleeve S is formed with the integral jaws $m$ which as shewn project outwardly from its outer periphery and the upper surfaces $n$ of which are suitably curved to co-act with the correspondingly formed surfaces $o$ of the detachable jaws $p$ to form seating surfaces for the tubes $i, j, k$, the detachable jaws $p$ carrying depending flanges $p'$ the lower ends of which are provided with the inwardly projecting lugs $s$ that engage the lateral edges of the lower surfaces $r$ of the jaws $m$.

It will be seen that by this arrangement the detachable jaws are readily adjusted in the required position and when the transverse members $i, j, k$, are laid on the seating surfaces $n$ and $o$, the detachable jaws $p$ are clamped into engagement with the same by means of the bolts $t$ the heads $u$ of which nest in the countersunk recesses $v$ in the jaws $m$.

It will be observed that the bolts $t$ can readily be inserted from the interior of the sleeve S and the recesses $v$ afford ample accommodation for the heads $u$ while preventing same from turning and yet allowing ample clearance for the bolts to swing through a limited angle for adjustment in the direction of strain.

The heads $u$ are preferably square but may be of any other convenient shape. The depth of the jaws $m$ affords ample seating surfaces for the bolts $t$ so that they are not liable to damage or to bend while free to move as previously indicated during transport or storage or handling.

The lugs $s$ keep the jaws $p$ in position and prevent same from turning even when the nuts $w$ are slacked back to enable the transverse members to be removed.

In the modified construction shewn in Figures 5 and 7 the sleeve is formed so that it may be readily clamped in any desired position on a post 2 to carry a transverse member or putlog 2'. In this construction the wall of the sleeve is split throughout its entire depth so that it is in two parts S' and S2 hinged together by the pin 13 which passes through the upper and lower hinge lugs 3 and 4 on the sleeve S' and the central hinge lug 5 on the sleeve S2.

The half sleeves S' and S2 are clamped together to embrace the post 2 by means of the bolt 6. For the reception of this bolt co-acting lugs 7 and 8 project from the outer edges of the sleeves S' and S2 respectively, the lug 7 being provided with an open-ended slot 10 while the slot 9 in the lug 8 is formed with an inclined upper edge 9' so that the shank of the bolt 6 is free to move upwardly into the position shewn in the dash-and-dot lines in Figure 7 to permit adjustment of the sleeves S' and S2 without removal of the bolt, the wall of the sleeve being undercut at 11 to allow the rocking movement of the head 12.

The bolt 6 carries a deep locking nut 6' to ensure a longer thread; the nut is slightly tapered so that the lug 7 can be swung clear of the nut and also to facilitate the use of the spanner on same. The shank of the bolt 6 is preferably circular throughout its length so that it will bed snugly in the lugs 7 and 8 and also to facilitate its swinging movement.

The half sleeve S2 carries a fixed integral jaw 14 formed with a curved upper surface or seat 15 that coacts with a similarly formed surface 16 of a detachable jaw 17 for the reception of the putlog or transverse member 2'. The detachable jaw 17 is formed with a depending flange 18 the lower end of which has inwardly projecting lugs 19 to engage the lateral edges of the lower surfaces 20 of the fixed jaw 14.

The detachable jaw 17 is rigidly clamped against the putlog 2' by means of the bolts 21, the heads 22 of which nest in the countersunk recesses 23 in the fixed jaw 14. The construction of the jaws 14 and 17 is precisely similar to the construction of the fixed and movable jaws of the sleeve shewn in Figures 1 to 4. It is to be particularly noted that the sleeve, longitudinally divided for a portion of its length from each end, is of especial importance in connection with scaffolding work to which the present invention is more or less directed. Of course, in this type of sleeve connector, each post-like element cooperating therewith is independently secured in the element and either one of said post-like elements may be removed or inserted without in any way interfering with the proper gripping connection of the connector and others of such post-like elements. This tends to a more effective and simpler device for use in connection with scaffoldings, for in this construction the scaffolding elements may be made up in units, each including two columnar posts, four connecting sleeves and two putlogs. This unit may be assembled on the ground or anywhere and remain assembled during its successive uses in scaffolding work, so that when building up the scaffold all that is necessary is to assemble the units, one on top of the other, and then position the longitudinal braces or ledgers. This is only possible with a connecting sleeve which cooperates in gripping relation with a columnar post at each end, so that the release of the post at one end of the sleeve does not affect the grip of the sleeve at the opposite post. If the sleeve were divided longitudinally, this result could not be attained because when one columnar post was released, the other would also be released. It being borne in mind that the assembling of the scaffolding is carried out at successively increasing elevations, it is quite apparent that anything which tends to a simplification in such assemblage not only reduces the time but increases the safety of the builder, because the units as assembled are rigid in themselves and each unit may be readily connected with another unit below it without in any way loosening the relation of the parts of such lower unit and this would be utterly impossible if the sleeve were divided throughout its length.

What I claim is:—

1. A coupling sleeve for securing scaffold-forming elements in coupled relation, including a sleeve-like element divided vertically for a portion of its length at its upper and lower ends, with an unbroken intermediate portion, clamping means for independently clamping the upper and lower divided portions of the sleeve with respect to a post or posts inserted within such sleeve, the unbroken intermediate portion of the sleeve being formed with laterally projecting integral enlargements formed on their upper edges to correspond to the contour of the scaffold-forming elements, said enlargements being formed with openings extending through the enlargements and accessible from the interior of the sleeve, bolts passing freely through said openings from the interior of the sleeve, said bolts being limited in movements outwardly from the sleeve, clamping members cooperating with the bolts and bearing against the outer ends of the enlargements, said clamping members extending above the enlargements and being formed in said extension to provide a continuation of the curved upper faces of the enlargements to grip a scaffold-forming element, and nuts cooperating with the bolts to force the clamps into gripping cooperation with a scaffold-forming element and bind said element against the unbroken intermediate portion of the sleeve and against the curved upper face of the enlargement.

2. A coupling sleeve for securing scaffold-forming elements in coupled relation, including a sleeve-like element divided vertically for a portion of its length at its upper and lower ends, with an unbroken intermediate portion, clamping means for independently clamping the upper and lower divided portions of the sleeve with respect to a post or posts inserted within such sleeve, the unbroken intermediate portion of the sleeve being formed with laterally projecting integral enlargements formed on their upper edges to correspond to the contour of the scaffold-forming elements, said enlargements being formed with openings extending through the enlargements and accessible from the interior of the sleeve, bolts passing freely through said openings from the interior of the sleeve, said bolts being limited in movements outwardly from the sleeve, clamping members cooperating with the bolts and bearing against the outer ends of the enlargements, said clamping members extending above the enlargements and being formed in said extension to provide a continuation of the curved upper faces of the enlargements to grip a scaffold-forming element, nuts cooperating with the bolts to force the clamps into gripping cooperation with a scaffold-forming element and bind said element against the unbroken intermediate portion of the sleeve and against the curved upper face of the enlargement, and cooperating means on the lower edges of the clamps and the lower faces of the enlargements to guide the clamps in operative clamping movement, said means preventing independent swinging of the clamps when the latter have been moved to a position to free the scaffold-forming element.

HARRY KASSE KAPLAN.